United States Patent
Kubara

(10) Patent No.: US 8,319,826 B2
(45) Date of Patent: Nov. 27, 2012

(54) THREE-DIMENSIONAL IMAGE COMMUNICATION TERMINAL

(75) Inventor: Takashi Kubara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 13 days.

(21) Appl. No.: 12/686,153

(22) Filed: Jan. 12, 2010

(65) Prior Publication Data

US 2010/0110164 A1    May 6, 2010

Related U.S. Application Data

(62) Division of application No. 11/127,315, filed on May 12, 2005, now abandoned.

(30) Foreign Application Priority Data

| May 14, 2004 | (JP) | 2004-144496 |
| May 14, 2004 | (JP) | 2004-144497 |
| Nov. 5, 2004 | (JP) | 2004-321681 |

(51) Int. Cl.
H04N 7/12 (2006.01)

(52) U.S. Cl. ............... 348/47; 348/42; 348/46; 348/48; 348/51; 348/52

(58) Field of Classification Search ............ 348/42, 348/46, 47, 48, 51, 52
See application file for complete search history.

(56) References Cited

U.S. PATENT DOCUMENTS

| 3,895,867 A | 7/1975 | Lo |
| 5,467,154 A | 11/1995 | Gale |
| 5,668,595 A | 9/1997 | Katayama |
| 5,946,077 A * | 8/1999 | Nemirovskiy ............... 355/22 |
| 2005/0207486 A1 * | 9/2005 | Lee et al. ............ 375/240.01 |

FOREIGN PATENT DOCUMENTS

JP    10-75432    3/1998

* cited by examiner

Primary Examiner — Sath V Perungavoor
Assistant Examiner — Geepy Pe
(74) Attorney, Agent, or Firm — Dickinson Wright PLLC

(57) ABSTRACT

A three-dimensional image communication terminal can make communication in which there are a sense of being engaged on a place and a sense of reality by use of a three-dimensional image with naturalness and a high robust characteristic. A three-dimensional image communication terminal includes a three-dimensional image input section, a transmitting section that transmits an input image to a communication partner after image processing, a three-dimension image display section which monitor-displays a human image or an object image which was shot, and a telephone calling section which receives three-dimensional image information from a partner and communicates with the other end by voice. The three-dimensional image display section includes an integral photography type horizontal/vertical parallax display device. In the three-dimensional image input section, cameras 1, 2, 3, 4 are disposed in the vicinity of the three-dimensional image display section, in order to capture a telephone calling person or an object at an arbitrary position. The cameras can be configured so as to be detachable, and a human image or an object image, which was captured, is image-processed and becomes an image which can be viewed in three dimensions. Since a communication person can view an image in three dimensions, he can make natural communication.

9 Claims, 13 Drawing Sheets

THREE-DIMENSIONAL IMAGE COMMUNICATION TERMINAL

This is a divisional of application Ser. No. 11/127,315 filed May 12, 2005, which is based on Japanese Application No. 2004-144496 filed May 14, 2004, Japanese Application No. 2004-144497 filed May 14, 2004, and Japanese Application No. 2004-321681 filed Nov. 5, 2004, the entire contents of each of which are incorporated by reference herein.

BACKGROUND OF THE INVENTION

1. Field of the Invention

The present invention relates to a three-dimensional image communication terminal which can make communication in which there are sense of being engaged on a place and sense of reality by use of a three-dimensional image with naturalness and a high robust characteristic.

2. Description of the Related Art

As a representative example of a conventional image communication terminal, there was a TV phone. The TV phone is generally configured by an image input section having a camera which shoots a telephone calling person, an image display section which monitor-displays a telephone calling person image which was shot, and a conventional telephone calling section which transmits/receives this image information and communicates by voice. In a conventional TV phone, as means of inputting an image of a telephone calling person, transmission/reception by use of a two-dimensional image was commonly used, but a two-dimensional image is poor in depth sense and it was difficult to obtain such sense of being engaged on a place and such sense of reality that an actual partner exists right over there and is making communication. In addition, if an object, which appears in communication, is intended to be displayed as an image to a partner with whom communication is made, with sense of being engaged on a place, two-dimensional display is poor in sense of being engaged on a place and sense of reality.

From long ago, as means of displaying three-dimensional image information, there are a naked eye hypostatizing parallel method in which, as to two pieces of pictures, which include binocular disparity, a right image is viewed by a right eye and a left image is viewed by a left eye, a stereo scope of viewing by use of eyeglasses with a liquid crystal shutter and lenses which are different for a right eye and a left eye respectively, and an anaglyph system in which an image of a binocular disparity picture with different colors of red and blue is viewed through red and blue glasses. However, in case of viewing a three-dimensional image by these methods, particular eyeglasses and training were necessary.

In recent years, due to development of liquid crystal technologies, liquid crystal displays, which are capable of three-dimensional display without necessity of glasses, have been made public, one right after the other. Most of them are image splitter type three-dimensional liquid crystal display devices with no glasses, so-called parallax barrier type and lenticular lens type three-dimensional image display devices having only horizontal parallax. In the parallax barrier type and the lenticular lens type three-dimensional display devices, a three dimensional effect is generated by separating and supplying image optical paths spatially, in order to be able to view a right eye image from a right eye position and to view a left eye image from a left eye position. Therefore, image optical paths are separated and supplied to a right eye position and a left eye position spatially and periodically, and when the positions are misaligned, a three-dimensional figure is broken down. Since images including parallax in a horizontal direction are supplied as a fundamental principle, there is such a problem that a three-dimensional figure is broken down, when a right eye position and a left eye position are misaligned from a horizontal line. Therefore, when it is tried to carry out stereoscopic viewing for a long time with keeping a three-dimensional figure of a three-dimensional moving image, there is need to fix a right eye position and a left eye position to fixed positions in a space. However, this becomes an important problem for long hour communication. In addition, in such a system that a two-dimensional image exists in reality but nevertheless, a difference of parallax, which is included in left and right images, is converted into a three-dimensional image in a brain through a retina and it is recognized, eye fatigue is intensive and it is not suitable as long-term communication means, which is one of big problems.

Against misalignment of a right eye position and a left eye position in a horizontal direction, a method of controlling and correcting image optical paths in tune with the misalignment of positions, by specifying positions of eyes and a position of a face of a viewing person has been invented, but there occurs such burdens that a device becomes a large scale and a marker must be attached to a viewing person for sensing positions of eyes and a position of a face.

As a prior art document regarding a three-dimensional TV phone, there is, for example, JP-A-10-75432 publication.

SUMMARY OF THE INVENTION

The invention is one which was made in order to solve the above-described problems, and aims to provide a three-dimensional image communication terminal which enables communication having sense of being engaged on a place and sense of reality.

The invention is one which was made in order to solve the above-described problem, and is a three-dimensional image communication terminal which is an image communication terminal in which, disposed are a three-dimensional image input section having a camera which shoots a telephone calling person image or an object image, a three-dimensional image display section which monitor-displays a telephone calling person image or an object image which was shot, and a telephone calling section which transmits/receives this three-dimensional image information and communicates with the other party by voice, and is characterized in that three-dimensional image display section includes an integral photography type horizontal/vertical parallax display device, and cameras were disposed in the vicinity of the three-dimensional image display section, in order to shoot a telephone calling person or an object at an arbitrary position.

According to the invention, a telephone calling person can send a three-dimensional image with naturalness and a high robust characteristic, to the other party, and it is possible to realize a three-dimensional image communication terminal which enables communication having sense of being engaged on a place and sense of reality, without generating fatigue.

DESCRIPTION OF THE PREFERRED EMBODIMENTS

Hereinafter, embodiments of the invention will be described by use of FIGS. 1 through 13.

Embodiment 1

Hereinafter, a three-dimensional image communication terminal, which relates to an embodiment 1 of the invention, will be described.

Figure 1:
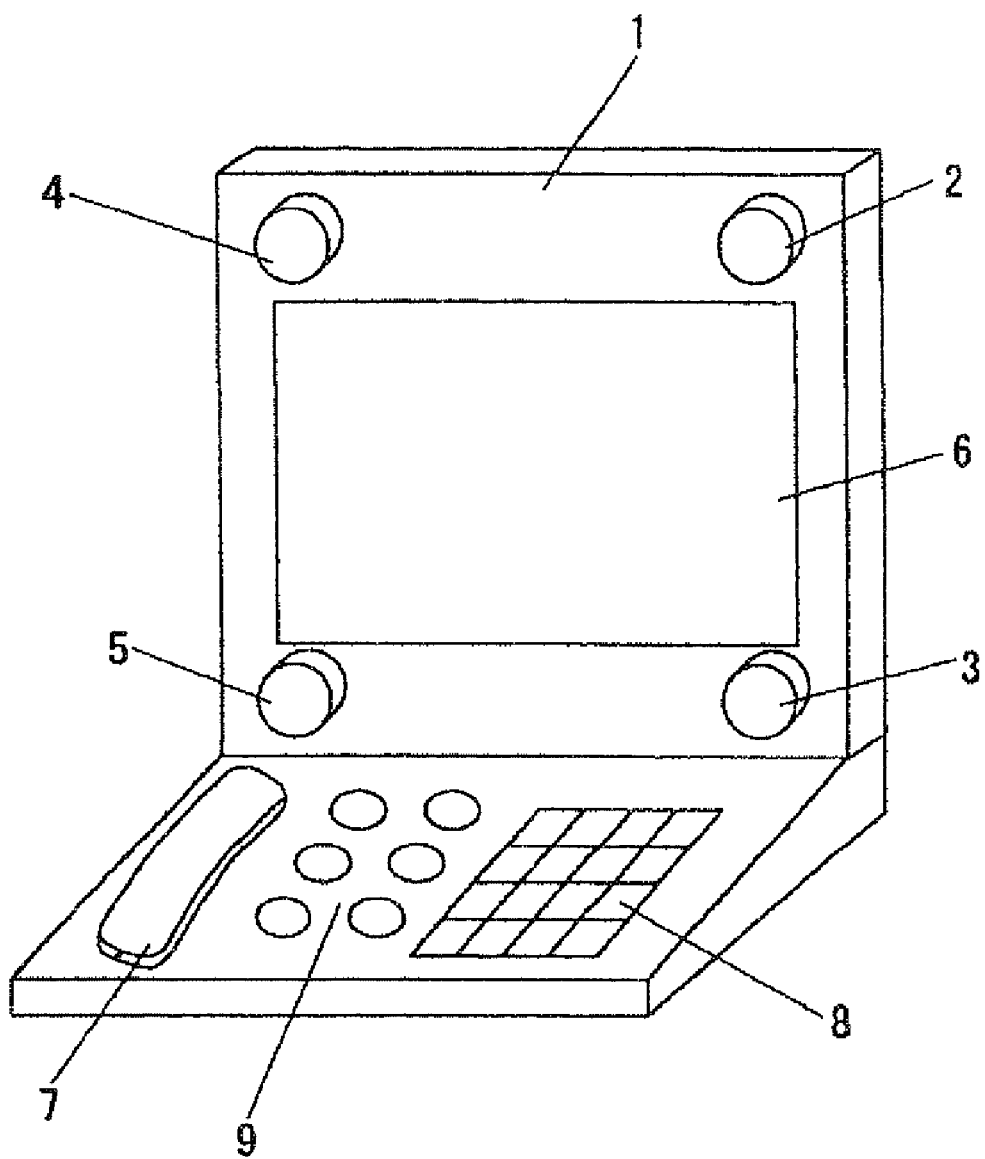
FIG. 1 is. a perspective view which shows a three-dimensional image communication terminal which relates to an embodiment 1 of the invention

In FIG. 1, 1 designates a housing of a three-dimensional image communication terminal. In the housing 1, as an input section which inputs a three-dimensional image, it is possible to use such a thing that, for example, four units of cameras 2, 3, 4, 5 were configured on an array. By using the four units of the cameras 2, 3, 4, 5, it is possible to obtain such directional image information that a three-dimensional object was viewed from respective directions. As this camera, suitable is one which is a CCD camera and a CMOS camera and has the number of pixels of approximately 1 through 2 million pixels. The reason why the number of pixels is the above-described one is that an amount of information is low in case of less than 1 million pixels, in order to express metallic luster and a texture of a raw material of an object such as a glass, a cloth, a fur, and a plant, as a three-dimensional object, and in case of this or more, sufficient power of expression is realized. In addition, the reason why it was set to 2 million pixels or less is to prevent an amount of data which a communication terminal transmits from becoming too enormous volume.

As a matter of course, in case that there is no deed to data-communicate three-dimensional image information as a communication terminal, and in case that there is no problem even if data is of large volume since it is possible to use a high speed transmission line, and so on, there is no need to limit to 2 million pixels or less.

This image includes parallax information in a horizontal direction and a vertical direction, and directional images in these four directions are image-processed and a certain image is interpolated among four pieces of images, and thereby, it is possible to obtain three-dimensional figure information of an object which was shot. It is possible to arbitrarily select setting positions and the number of cameras, but preferably, the number of cameras is 3 units or more, and setting positions are at the periphery of a display section 6, and they are set so as to be dispersed in left/right, upward/downward directions, which is better.

Because it becomes possible to include horizontal parallax information and vertical parallax information in an image to be shot, in case that cameras are set at the periphery of the display section 6, so as to be dispersed in left/right, upward/downward directions.

In addition, in case that 3 units of cameras are used, although it is not shown in the figure, 2 units of cameras are disposed at left and right position above the display section 6, and a camera is disposed at a roughly center position below the display section, which becomes a position of a relationship between above and below, against these two units of cameras.

If this arrangement is used, horizontal direction parallax information is sufficiently obtained, and vertical direction parallax information becomes a little bit less than this.

However, the suchlike arrangement enables to convey a three-dimensional object more effectively, by less information as a way of conveying information of a three-dimensional object, since a human is sensitive to left and right information, from the view point of a characteristic of parallax of a human, but is not sensitive to upper and lower information.

In addition, it is also possible to obtain three-dimensional image information by configuring a camera array of 4 units or more, but when the number of cameras increases, it is possible to increase parallax information but there occur such problems that cost becomes high, and it takes time for image processing, and a size of a device itself becomes larger, and therefore, there is need to consider configurations for purposes.

Besides the camera array, by use of a camera which can obtain distance information and image information, it is also possible to shoot in three-dimensional image information. As a method of obtaining distance information, there are a method of using an infrared ray and a strobe light in "RANGE FINDER APPARATUS" which is described in JP-A-11-21810 publication, a method by use of "RANGE FINDER APPARATUS AND CAMERA" which is described in JP-A-2001-1209 publication, and so on.

In addition, by use of a camera in which refractive index distribution type lenses were assembled as a two-dimensional array, it is also possible to shoot in three-dimensional image information in an integral photography image data form. An example of its use is described in "PICKUP IMAGE DISPLAY APPARATUS FOR THREE-DIMENSIONAL IMAGE" which is described in JP-A-2004-54153 publication, and so on.

To a front surface of a housing 1 of a three-dimensional image communication terminal, an image display section 6 of the three-dimensional image communication terminal is attached, and in the image display section 6, an integral photography type horizontal/vertical parallax display device is placed, and a lens array or a pin-hole array for projecting a parallax display image on a front surface of the horizontal/ vertical parallax display device to form an image in a space is configured to reflect a human image or an object image. As a back panel of the horizontal/vertical parallax display device, a liquid crystal panel is adopted. Besides, it is possible to adopt an organic EL panel, a plasma display panel, and so on, but in order to realize natural three-dimensional display, there is need to adopt a display panel having resolution of at least 200 dpi or more.

Further, a normal telephone receiver handset 7, a dial key set 8 and a function key set 9 of a normal telephone receiver are placed. As another communication function, it is also possible to place a telephone transmitter section and a telephone receiver section by which it becomes possible to make interactive communication with a partner without a handset.

The three-dimensional image communication terminal is, as described above, one which displays a three-dimensional object on the image display section 6, and it may be also one which displays a face of a partner at a communication destination on the image display section 6 in three dimensions by using it as an application of a TV phone, or one which displays a three-dimensional object which oneself shot by a camera, on the image display section 6.

Figure 2:
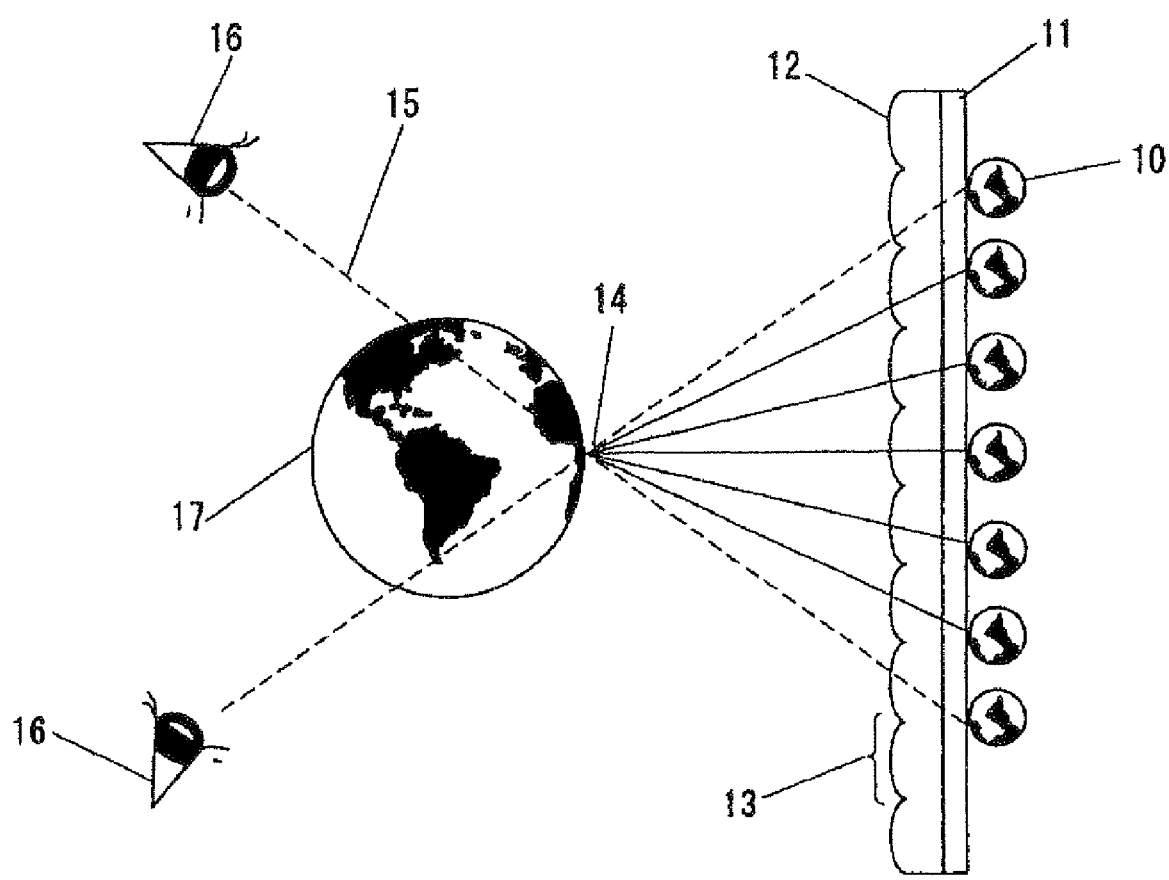
FIG. 2 is a fundamental principle view of integral photography which is a three-dimensional display system of a display section of the three-dimensional image communication terminal which relates to the embodiment 1 of the invention.

Here, an integral photography system will be described in detail. FIG. 2 shows a fundamental principle of the integral photography system. The integral photography is one which was proposed in 1908 by M. G. Lipmann, and is one which reproduces a three-dimensional image, by placing a film at a focal position of a fly eye shaped convex lens array, and by recording an image with respect to each fly eye shaped convex lens on a surface of that film, and by reproducing, at the time of reproduction, the image with respect to each fly eye shaped convex lens which was recorded on the film, by using a fly eye shaped convex lens array which is identical to one at the time of shooting.

As shown in FIG. 2, when display is realized by having a display device 11 for displaying a reproduction element image 10 corresponded to each convex lens 13 of a fly eye shaped convex lens array 12, the reproduction element image 10 is formed as an image at an image forming position 14 which corresponds to a pixel position of an original image surface, through the convex lens 13. On that account, when it is viewed from a viewing person, a light ray 15 is actually generated from the image forming position 14, and it is incident to eyes 16 of a viewing person, and thereby, a three-dimensional reproduction image 17 having a stereoscopic effect is reproduced. As to the three-dimensional reproduction image 17, it is possible to view the three-dimensional reproduction image 17 having a stereoscopic effect even if an angle is changed and positions of eyes are moved, since there is the image forming point actually in a space.

Figure 12:
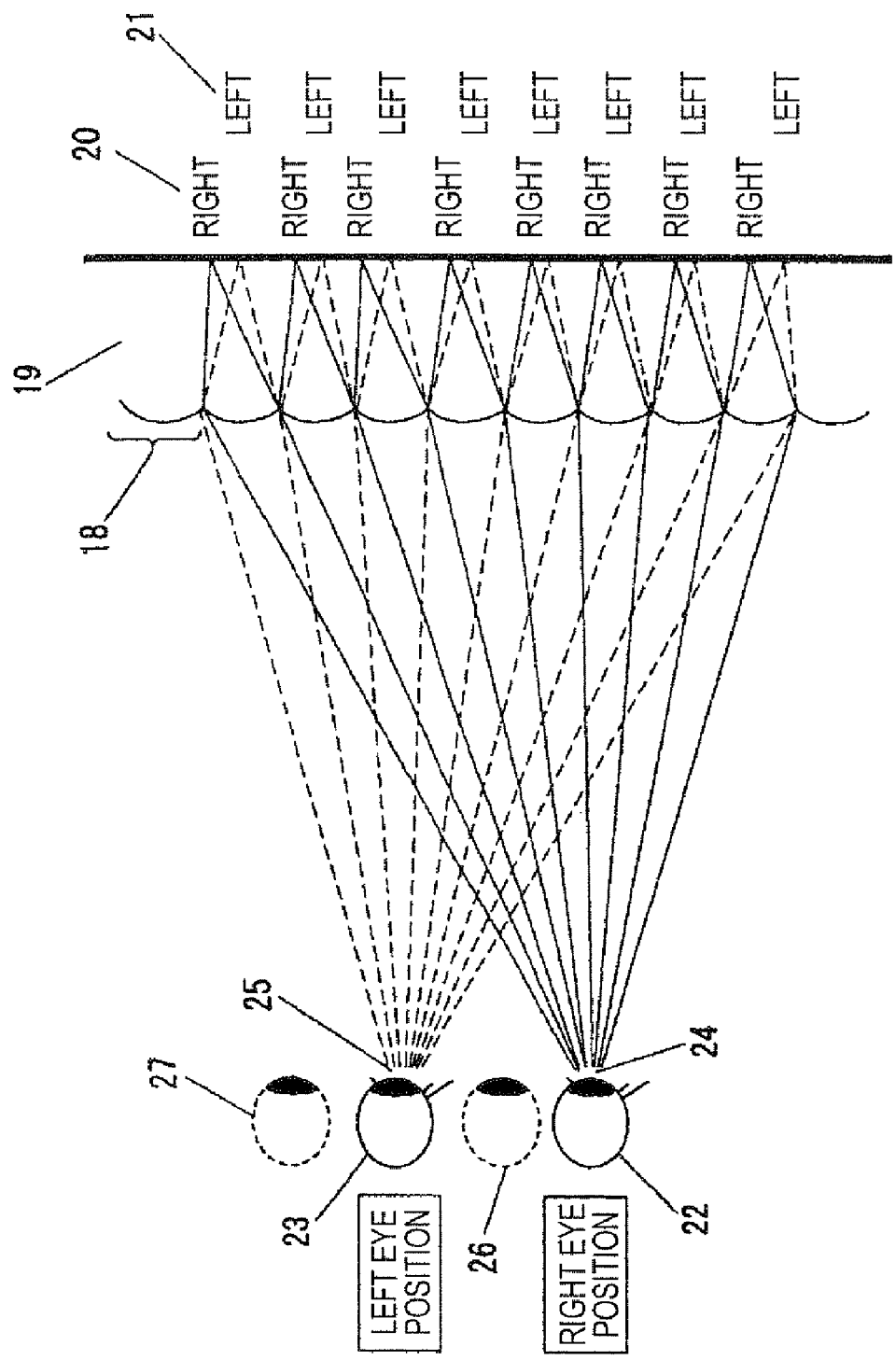
FIG. 12 is a fundamental principle view of a lenticular system which is a conventional three-dimensional display system.

In contrast to this, in a lenticular system of FIG. 12, at the back of such a lenticular lens array 19 that a number of wagon roof shaped lenses 18 are lined up in a vertical direction, right eye images 20 and left eye images 21 are placed with respect to each row. Respective images, which were placed, are refracted by the wagon roof shaped lenses 18, and incident to a right eye 22 and a left eye 23, respectively, in a manner of pinpoint. In this regard, however, since a position, where a binocular vision image can be seen normally, is dependent on a focal position of the wagon roof shaped lens 18, when positions of the right eye 22 and the left eye 23 of a viewing person are moved from image forming positions 24, 25 of left and right images to a shifted position 26 of a right eye, and a shifted position 27 of a left eye, binocular vision is broken down. Therefore, eye positions 22, 23 of a viewing person are restricted to the image forming positions 24, 2 of a right eye image and a left eye image.

Figure 13:
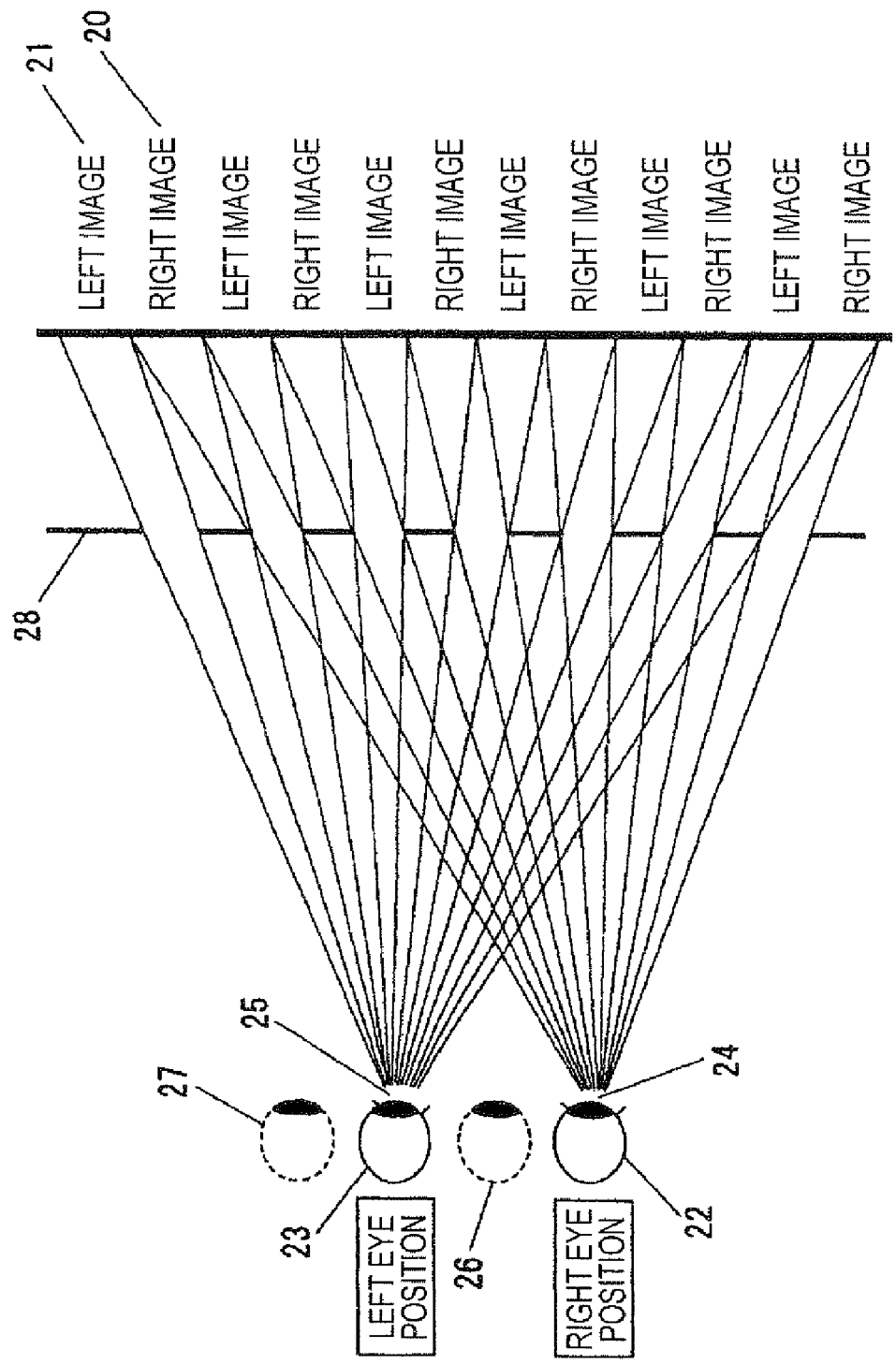
FIG. 13 is a fundamental principle view of a parallax system which is a conventional three-dimensional display system.

In addition, a parallax system of FIG. 13 is a system which uses a row 28 of a vertically long slid barrier in lieu of the wagon roof shaped lenses 18. In this parallax system, the placed right eye image 20 and left eye image 21 are incident to the right eye 22 and the left eye 23, respectively, in a pinpoint manner, through the row 28 of slid barrier. In this regard, however, since a position, where it is possible to view a binocular vision image normally, is dependent on a status of placement of the row 28 of slid barrier, when positions of the right eye 22 and the left eye 23 of a viewing person are moved from image forming positions 24, 25 of left and right images to a shifted position 26 of a right eye, and a shifted position 27 of a left eye, binocular vision is broken down. Therefore, eye positions 22, 23 of a viewing person are restricted to the image forming positions 24, 2 of a right eye image and a left eye image, and therefore, a position where a binocular vision can be realized, is limited, in the same manner as the lenticular system. Furthermore, this system uses the row 28 of vertically long slit barrier, and therefore, an image becomes dark.

Figure 3:
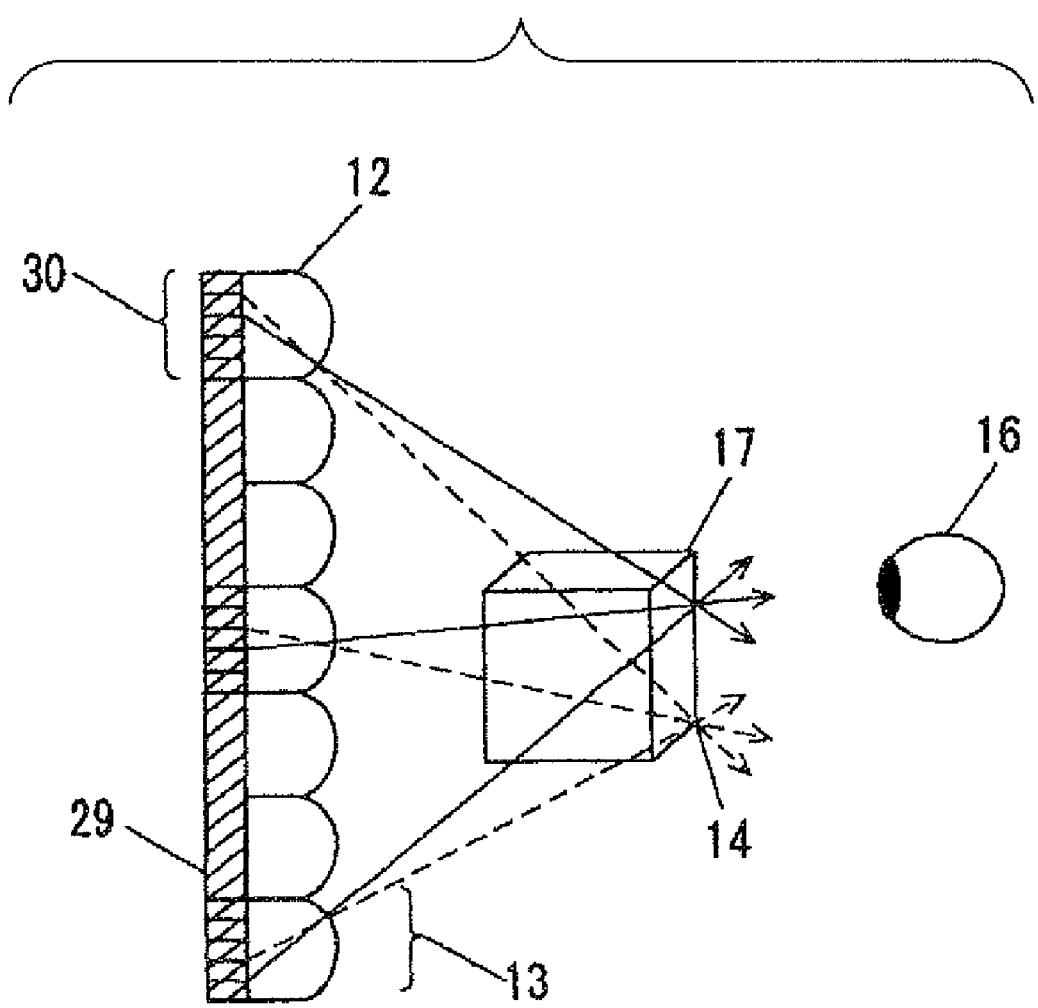
FIG. 3 is a structural view of an integral photography display section of a three-dimensional image communication terminal of the invention.

In the above-described embodiment, the integral photography system is adopted from the above-described reason.

next, a configuration of an integral photography display section of the three-dimensional image communication terminal in this embodiment will be described by use of FIG. 3. As described in FIG. 2 which is a fundamental principle view of integral photography, in order to display a three-dimensional stereoscopic image, required is a display device 30 which carries out display by having the reproduction element image 10 corresponded to each convex lens 13 of the fly eye shaped convex lens array 12.

In this embodiment, as the display device 30, a liquid crystal panel 29 was used. A performance of the liquid crystal panel 29 is selected on the basis of parallax number and resolution of a three-dimensional image which is intended to be displayed. The resolution is governed by a diameter of the convex lens 13 of the fly eye shaped convex lens array 12. In this embodiment, one in which a diameter of the convex lens is 1.5 mm is used, and as the liquid crystal panel 20, one with resolution of 200 dpi was used. By this means, the reproduction element image 10 of one lens is configured by an image of 10×10 pixels, and it is possible to reproduce such a three-dimensional stereoscopic image that parallax numbers in horizontal/vertical directions is 10, respectively and a visual field is smooth. When resolution of the liquid crystal panel 29 becomes 200 dpi or less, it becomes difficult to obtain a natural stereoscopic reproduction image. Although there occurs trade-off with data processing time, in order to obtain a natural three-dimensional stereoscopic image as much as possible, it is effective to reproduce the reproduction element image 10 with resolution of 200 through 700 dpi, by use of a lens of 1.5 mm or less. As means of displaying the reproduction element image 10, besides the liquid crystal panel 29, as a matter of course, it is possible to use a plasma display panel, and an organic EL panel.

By the above-described configuration, the light ray 15 for forming the three-dimensional reproduction image 17 reproduced by the display device 30 is incident to the eyes 16 of a viewing person, and thereby, a three-dimensional stereoscopic image is recognized by the viewing person.

Embodiments 2 through 4, which will be hereinafter described, will disclose a technology regarding a three-dimensional image reproducing device for carrying out display with higher resolution, higher image quality and more increased stereoscopic effect, than three-dimensional image display of the three-dimensional image communication terminal which is described in the embodiment of the invention. Meanwhile, it is suitable as a display device of a three-dimensional image communication terminal, and it is also possible to utilize it as a three-dimensional display, stereoscopic image reproducing device which is used in other applications (e.g., an imaging technology field, an amusement field, an entertainment field, an Internet field, an information field, a multimedia field, a communication field, an advertisement/promotion field, a medical field, an art field, a design support field, a simulation field, virtual reality etc.)

Embodiment 2

Hereinafter, an embodiment of the invention will be described by use of FIGS. 4 through 6.

Figure 4:
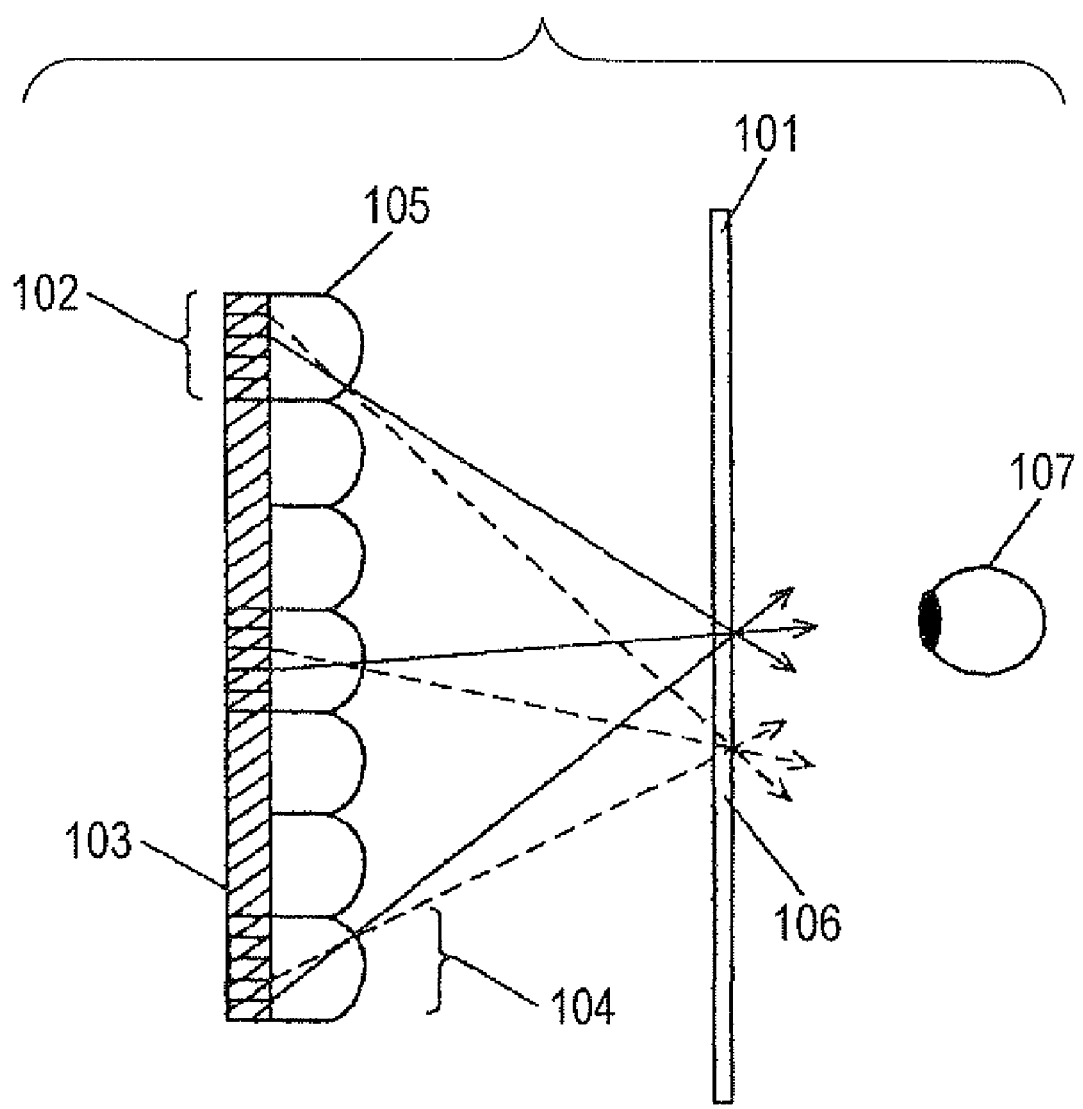
FIG. 4 is an explanatory view of a three-dimensional image reproducing device which relates to an embodiment 2 of the invention.
Figure 5:
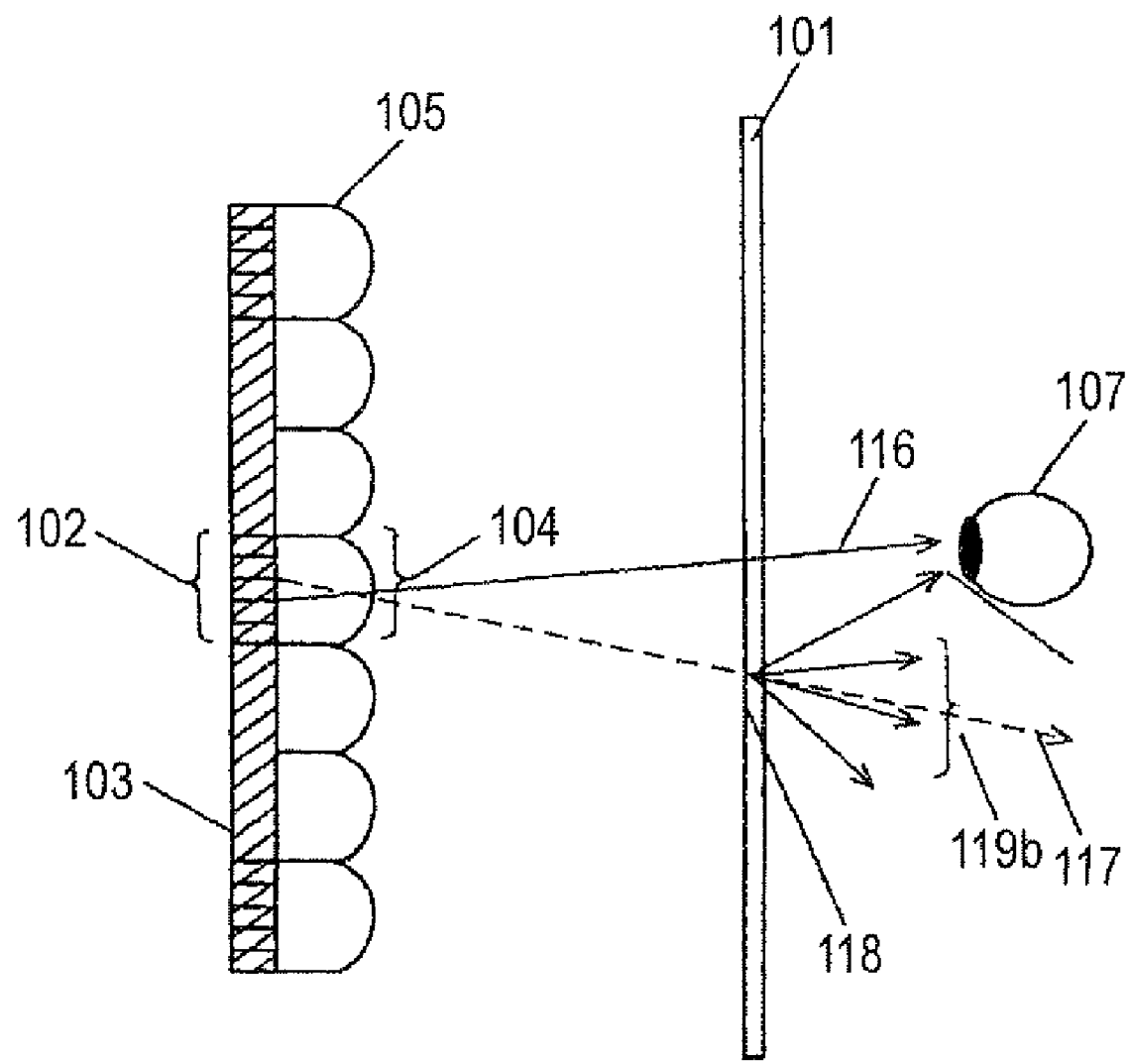
FIG. 5 is an explanatory view of an effect of a diffusion type volume hologram which relates to the embodiment 2 of the invention.

In FIG. 4, as a method of carrying out display of three-dimensional image information in this three-dimensional image reproducing device, the integral photography system is adopted, and a display device 103 which displays horizontal/vertical parallax images 102, and a convex lens array 105 in which convex lenses 104 are congregated in a plane shape, in order to form each parallax image of the horizontal/vertical parallax images 102, are placed. Three-dimensional image information, which was formed as an image at an image forming position 106 in the vicinity of the convex lens 104, is incident to an eye 107 of a viewing person, and becomes a three-dimensional stereoscopic image including a plurality of vertical/horizontal parallaxes.

As the display device 103 which is used in the three-dimensional image reproducing device of FIG. 4, a liquid crystal panel is adopted. In this embodiment, one in which a diameter of the convex lens is 1.5 mm is used, and as the liquid crystal panel 20 which displays the horizontal/vertical parallax image 102, one with resolution of 200 dpi was used. By this means, a reproduction element image 108 of one lens is configured by an image of 10×10 pixels, and it is possible to reproduce such a three-dimensional stereoscopic image that parallax numbers in horizontal/vertical directions is 10, respectively and a visual field is smooth. When resolution of the liquid crystal panel, which is the display device 103, becomes 200 dpi or less, it becomes difficult to obtain a natural stereoscopic reproduction image. Although there occurs trade-off with data processing time, in order to obtain a natural three-dimensional stereoscopic image as much as possible, it is effective to reproduce the reproduction element image 108 with resolution of 200 through 700 dpi, by use of a lens of 1.5 mm or less. As means of displaying the reproduction element image 108, besides the liquid crystal panel, as a matter of course, it is possible to use a plasma display panel, and an organic EL panel.

In the vicinity of the image forming point 106 of the convex lens 104, a diffusion type volume hologram screen 101 was disposed, as means of projecting a light ray including a plurality of three-dimensional images on a two-dimensional plane. By use of FIG. 5, an advantage of the diffusion type volume hologram screen which relates to an embodiment of the invention will be described in detail. As shown in FIG. 5, the horizontal/vertical parallax image 102 of the display device 103 is formed as an image at an image forming point 118 in the vicinity of a focal distance of the convex lens 104 by the convex lens 104 which exists directly on a corresponding horizontal/vertical parallax image 102 in the convex lens array 105, but since a light ray 116, which is incident to the eye 107 of a viewing person in a straight line, directly from a position of the image forming point 118, is one light ray according to each convex lens 104, resolution is lowered dependently on a diameter of the convex lens array 105. However, in the vicinity of the image forming point 118, by placing the diffusion type volume hologram screen 101 for scattering a light ray 117 which is not incident directly to an eye of a viewing person, the light ray 117, which is not incident directly to an eye, becomes a group of light rays 119a, 119b. Among the group of these light rays 119a, 119b, the light ray 119a, which was incident to an eye of a viewing person, is recognized by a viewing person as a new parallax image, and by this means, spatial resolution is improved, and therefore, superficial image quality of an image is improved, and a stereoscopic effect is amplified.

As one which has a role of a diffusion plate for scattering the light ray 117 which is not incident directly to an eye, there are an obscured glass, such a diffusion sheet that a surface of plastic was rugged, such a hologram diffusion sheet that an emboss hologram process was applied to a surface of plastic, and so on, but since these diffusion plates scatters light randomly by a rugged configuration of a material to form an image, an image becomes out of focus by noises of scattered light over all. However, since the diffusion type volume hologram screen 101 diffracts light by variable distribution of a refractive index which was distributed in volume, it is transparent normally but when light is applied thereto, it can form a clear image.

Figure 6:
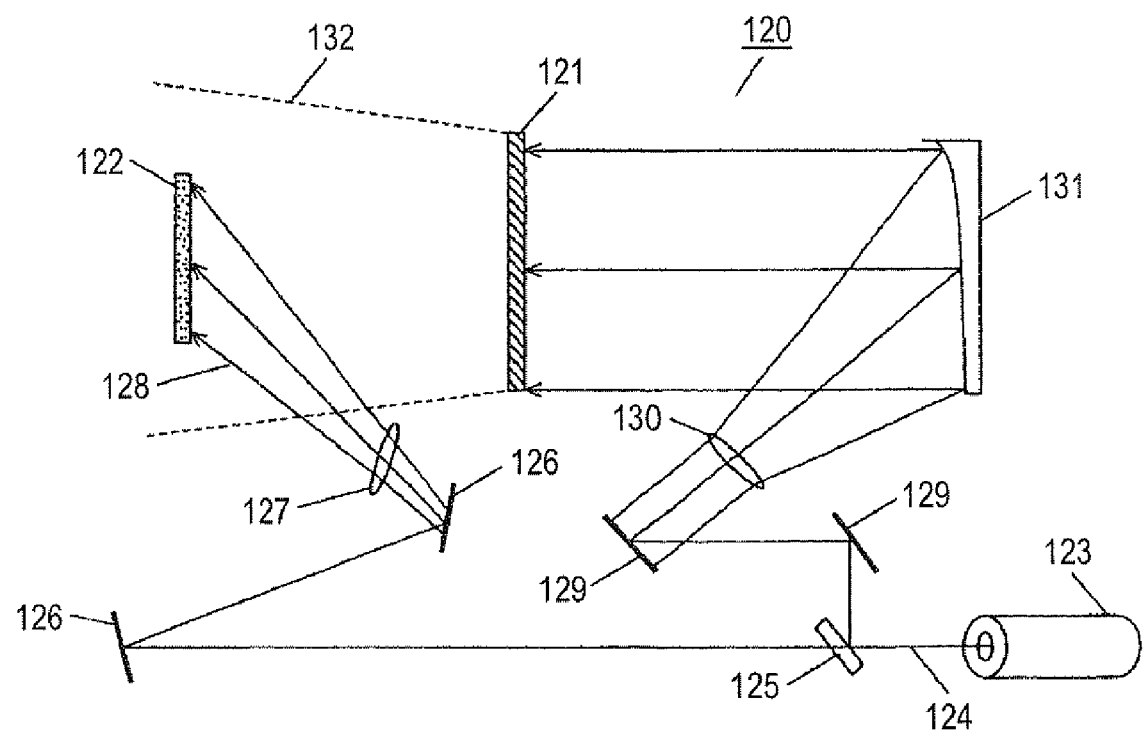
FIG. 6 is an explanatory view of a forming method of the diffusion type volume hologram which relates to the embodiment 2 of the invention.

A hologram device, which is used for the diffusion type volume hologram screen 101 in this embodiment, is manufactured by recording a diffusion body 121 on a photosensitive member 122 such as photo polymer, by an exposure optical system 120 as shown in FIG. 6.

In this manufacturing method, a laser beam (e.g., wavelength 532 nm), which was emitted from a laser oscillator 123 (e.g., Nd:YAG laser), is divided into two directions by a beam splitter 125. On light passes through two pieces of reflecting mirrors 126 and becomes divergent light by an expander 127, and thereafter, is projected to the photosensitive member 122 as reference light 128. In addition, the other light also passes through two pieces of reflecting mirrors 129 and becomes divergent light by an expander 130, and thereafter, is introduced to a parabolic mirror 131. Light, which was reflected by the parabolic mirror 131, passes through the diffusion body 121 and becomes diffusion light, and thereafter, is projected to the photosensitive member 122 as object light 132. By the diffusion type hologram screen using the hologram device manufactured in this manner, it is possible to have a light ray including a light ray which does not reach directly to a retina, reached to a retina, and it is possible to form a three-dimensional stereoscopic image having high resolution, high image quality and high stereoscopic effect.

In the above-described explanation, a convex lens array is used as an optical path control mechanism of a light ray, but there is not such a case that this is exclusively used, and it is possible to use a pin-hole array. In addition, as a material of the diffusion type volume hologram screen, it is possible to use photo polymer and photosensitive gelatin.

Embodiment 3

Hereinafter, an embodiment 3 of the invention will be described with reference to FIGS. 7 through 10.

A three-dimensional image display device, which relates to the embodiment 3 of the invention, is configured by a light source 201, a polarizing beam splitter 203, a projection device 204, a projection lens 205, an image forming screen 206, and a convex lens array 207.

As the light source 201, it is possible to use a halogen lamp. As other light sources, it is possible to use a light-emitting diode (LED) of each color and an organic electroluminescence (EL). In particular, a white color LED is most suitable as an alternative of a halogen lamp.

As the projection device 204, it is possible to use D-ILA (Direct Drive Image Light Amplifier) made by Victor Company of Japan, a LSM18HDA01B1 panel made by Hitachi, Ltd., and so on.

As the image forming screen 206, it is possible to adopt a hologram screen, and besides this, it is possible to use an emboss type diffusion plate, and a hologram diffusion plate.

Figure 7:
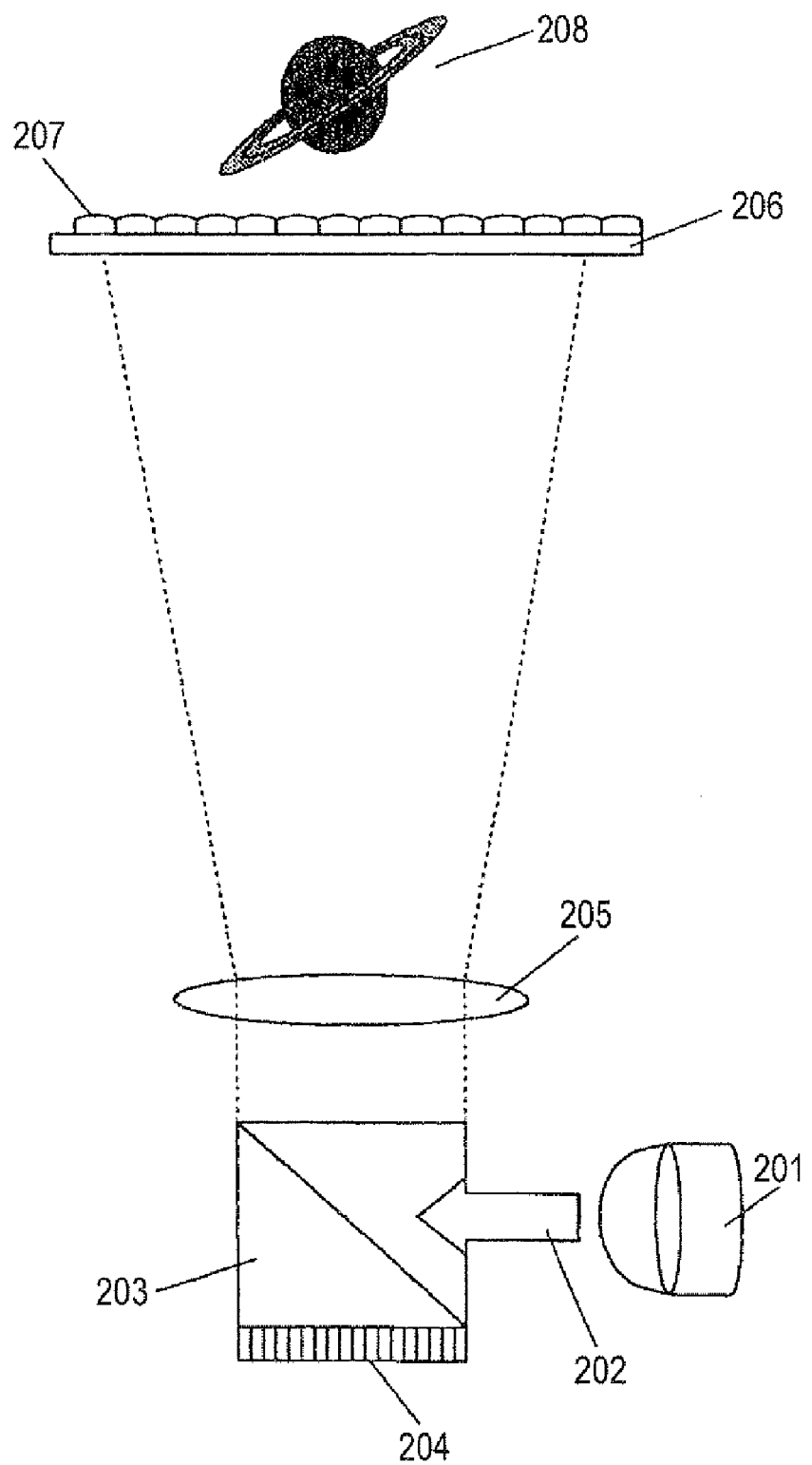
FIG. 7 is a view which explains a three-dimensional image display device which relates to an embodiment 3 of the invention.

In FIG. 7, light 2, which was emitted from the light source 201, is incident to the polarizing beam splitter 203, and thereafter, only S waves are reflected by a boundary face of the polarizing beam splitter 203, and incident to the projection device 204 as projection means for controlling a shape of a projection image. The S waves, which were incident to the projection device 204, are modulated by projection image information in an inside of the projection device 204, and image information is added thereto. At this time, light, which is not modulated, is reflected as S waves, and passes through a path opposite to one at the time of incoming and returns to the light source 201, and therefore, light is not launched to become a state of black. On one hand, S waves, which were modulated, are converted into light including a P wave component according to a level of modulation, and it passes through the polarizing beam splitter 203, and projected to the image forming screen 206 through the projection lens 205, and a projection image is formed. Since the formed projection image becomes an integral photography type ray trace image, it is possible to form a three-dimensional image 208 in a space through a convex lens array 207.

In the embodiment 3 of the invention, as a convex lens 212, one in which a diameter of the convex lens is 1.5 mm was used. Resolution of a projection image which was projected to the image forming screen 206 and formed was set to 200 dpi. By this means, a reproduction element image 209 of one lens is configured by an image of 10×10 pixels, and it is possible to reproduce such a three-dimensional stereoscopic image that parallax numbers in horizontal/vertical directions is 10, respectively and a visual field is smooth. However, when resolution of the formed projection image becomes 200 dpi or less, it becomes difficult to obtain a natural stereoscopic reproduction image. Although there occurs trade-off with data processing time, in order to obtain a natural three-dimensional stereoscopic image as much as possible, it is effective to reproduce a reproduction element image 209 with resolution of 200 through 700 dpi, by use of a lens of 1.5 mm or less.

Figure 8:
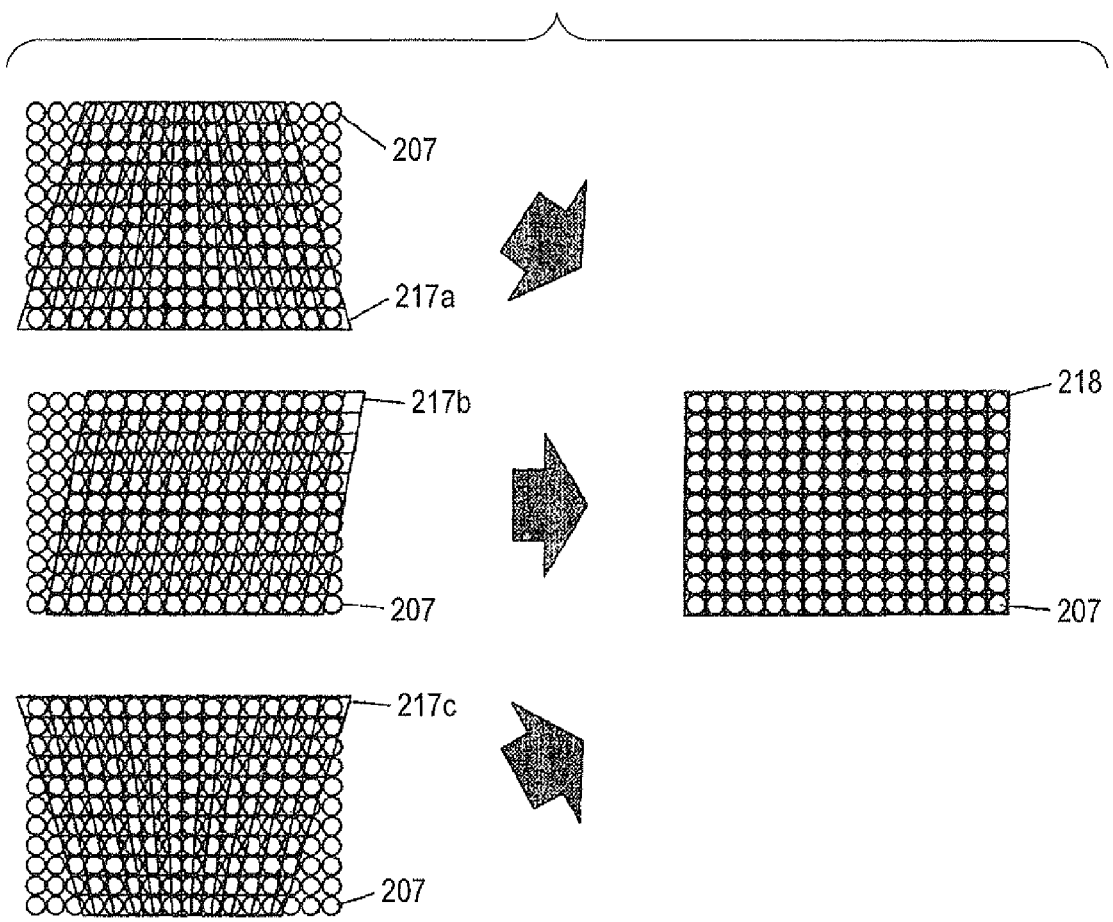
FIG. 8 is an explanatory view of projection means for deformation-controlling a shape of a projection image of the invention.

As shown in FIG. 8, when a projection image is projected to the screen 206 through the projection lens 205, it is normally displayed as distorted projection images 217a, 217b, 217c and incident to the convex lens array 207. When a projection image is distorted in this manner, image quality of a three-dimensional reproduction image 216 is lowered, since alignment of the convex lens 212 and the reproduction element image 209 is out of tune. In order to correct this distortion, an actual projection area is set up in advance so as to be smaller than the number of pixels of the projection device 204, and a distorted portion is projected in such a manner that an array of the lens array 207 coincides with the alignment to obtain a projection image 218 in which distortion was corrected, and thereby, it becomes possible to reproduce a stereoscopic image with high resolution and high image quality.

Figure 9:
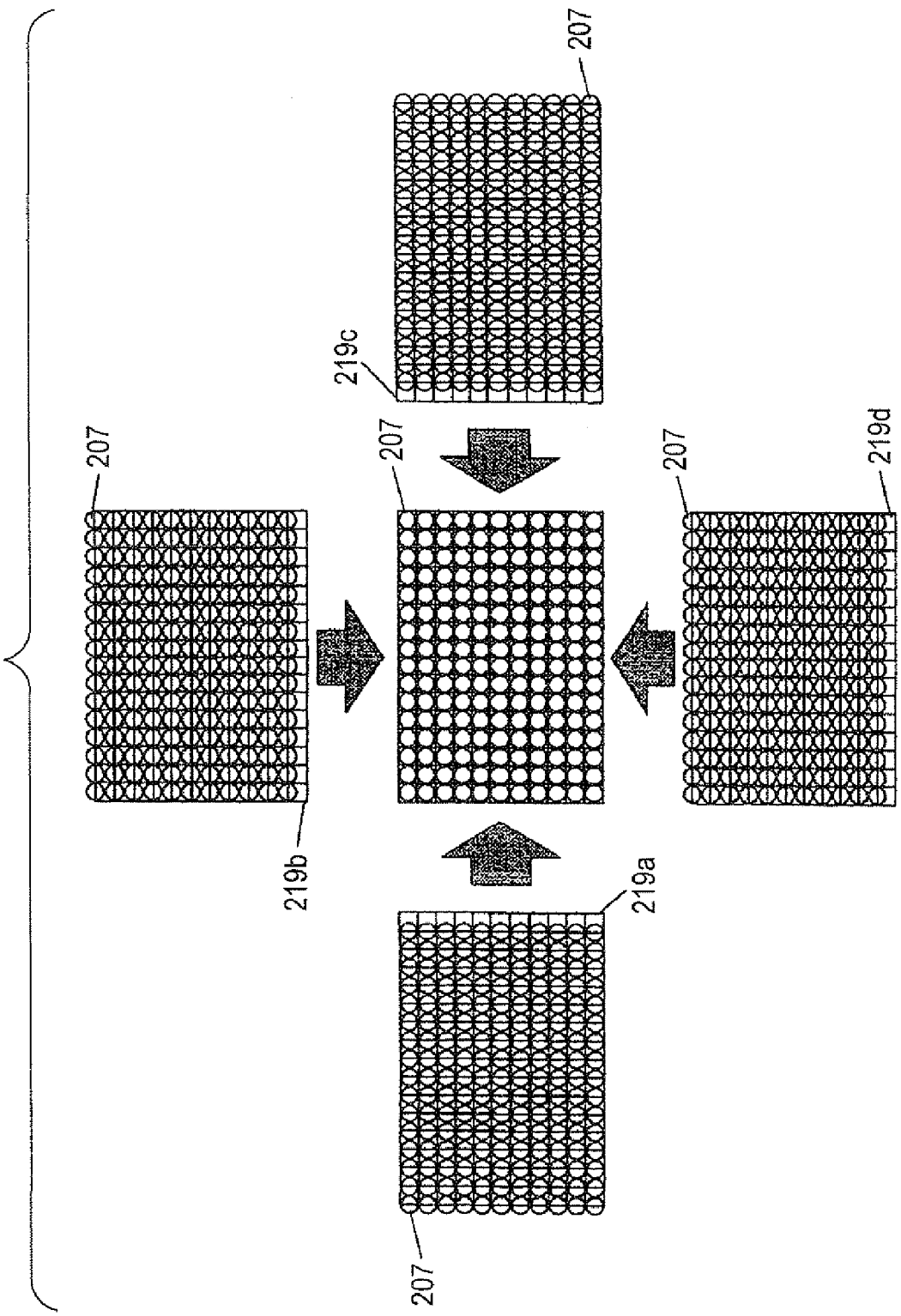
FIG. 9 is an explanatory view of projection means for shift-controlling a shape of a projection image of the invention.

As shown in FIG. 9, even in case that shifted projection images 219a, 219b, 219c, 219d are realized, since there is no distortion but an array of the convex lens array 207 and an array of the reproduction element image 209 are shifted spatially, an actual projection area is set up in advance so as to be smaller than the number of pixels of the projection device 204, and a shifted portion is corrected in a direction which is opposite to a shift direction, and projected in such a manner that an array of the convex lens array 207 coincides with the alignment, to obtain a shift corrected projection image 220, and thereby, it becomes possible to reproduce a stereoscopic image with high resolution and high image quality.

Embodiment 4

Figure 10:
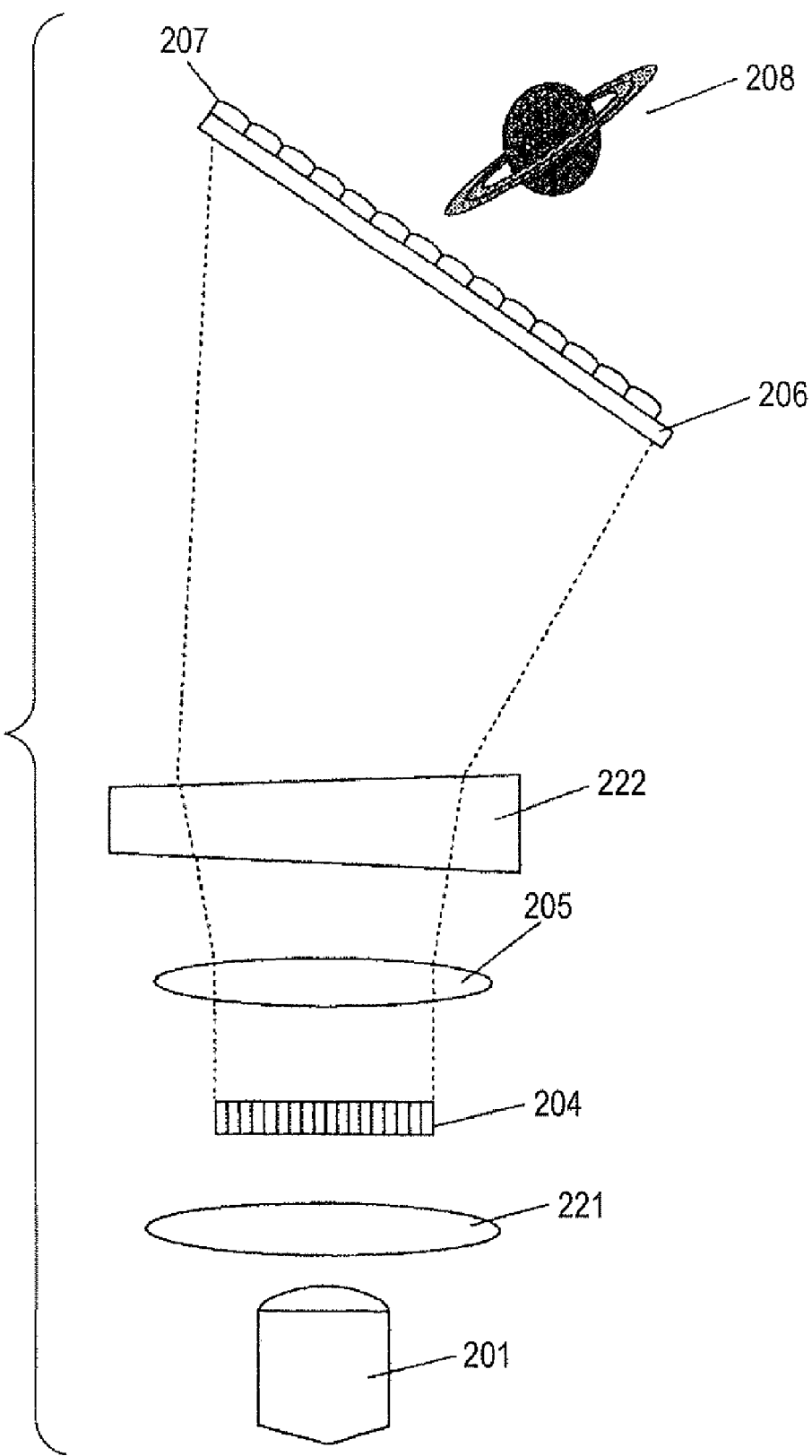
FIG. 10 is an explanatory view which shows a three-dimensional display device which relates to an embodiment 4 of the invention.

In FIG. 10, light, which was emitted from the light source 201, is condensed by a condenser lens 221, and incident to a projection device 204 as projection means for controlling a shape of a projection image. As the projection device 204, it is possible to use transmission type liquid crystal. Light, which was incident to the projection device 204, is modulated by projection image information in an inside of the projection device 204, and image information is added thereto. Modulated light passes through a projection lens 205, and a projection angle is changed by a prism 222, and it is projected to an image forming screen 206. Since the formed projection image becomes an integral photography type ray trace image, it is possible to form a three-dimensional image 208 in a space through a convex lens array 207. In this configuration, since a projection plane is changed by passing through the prism 222, it is possible to take a freedom level of design of a stereoscopic reproducing device, larger.

As a light source 201, a while color LED is used. As other light sources, it is possible to use LED of each color and organic EL, a halogen lamp. As the screen 206, a hologram diffusion plate is adopted. As other screens 206, it is possible to use an emboss type diffusion plate, and a hologram screen. As a convex lens 212, one in which a diameter of the convex lens is 1.5 mm was used. Resolution of a projection image which was projected to the image forming screen 206 and formed was set to 200 dpi. By this means, a reproduction element image 209 of one lens is configured by an image of 10×10 pixels, and it is possible to reproduce such a three-dimensional stereoscopic image that parallax numbers in horizontal/vertical directions is 10, respectively and a visual field is smooth. When resolution of the formed projection image becomes 200 dpi or less, it becomes difficult to obtain a natural stereoscopic reproduction image. Although there occurs trade-off with data processing time, in order to obtain a natural three-dimensional stereoscopic image as much as possible, it is effective to reproduce a reproduction element image 209 with resolution of 200 through 700 dpi, by use of a lens of 1.5 mm or less.

Also in this embodiment, correction of distortion and shift of a projection image was carried out in the same manner as in the embodiment 3. As a result of this, it became possible to reproduce a stereoscopic image with high resolution and high image quality.

Embodiment 5

A three-dimensional image communication terminal in this embodiment 5 is such a thing that the projection type three-dimensional image reproducing device of the embodiment 3 or 4 of the invention was incorporated in a three-dimensional image communication terminal.

Figure 11:
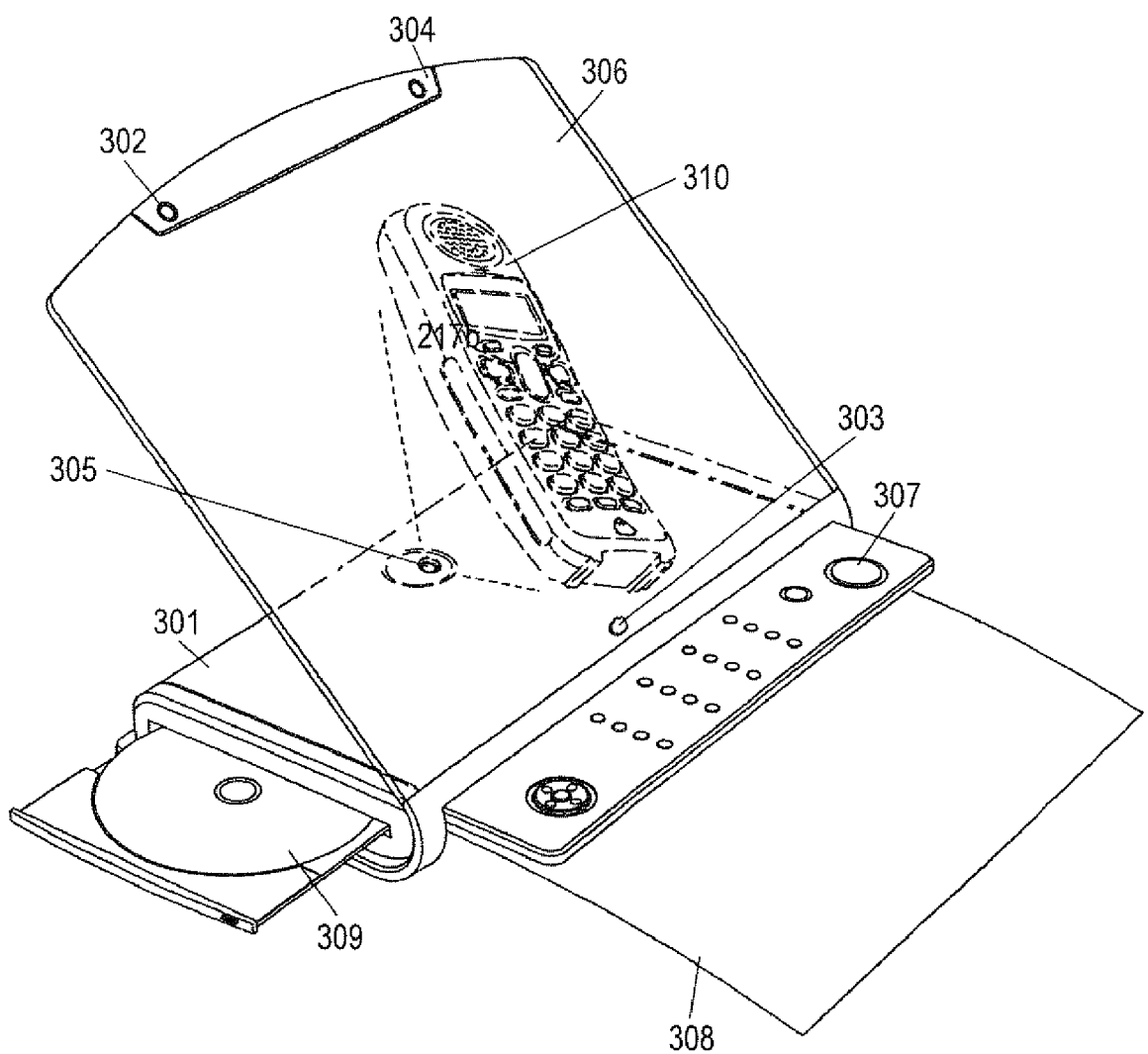
FIG. 11 is an explanatory view which shows a three-dimensional image communication device which relates to an embodiment 5 of the invention.

In FIG. 11, 301 designates a housing of a three-dimensional image communication terminal. In the housing 301, as an input section which inputs a three-dimensional image, it is possible to use such a thing that, for example, three units of cameras 302, 303, 304 were configured on a display section 306. By using the three units of the cameras 302, 303, 304, it is possible to obtain such directional image information that a three-dimensional object was viewed from respective directions.

As this camera, suitable is one which is a CCD camera and a CMOS camera and has the number of pixels of approximately 1 through 2 million pixels. The reason why the number of pixels is the above-described one is that an amount of info iation is low in case of less than 1 million pixels, in order to express metallic luster and a texture of a raw material of an object such as a glass, a cloth, a fur, and a plant, as a three-dimensional object, and in case of this or more, sufficient power of expression is realized. In addition, the reason why it was set to 2 million pixels or less is to prevent an amount of data which a communication terminal transmits from becoming too enormous volume.

As a matter of course, in case that there is no deed to data-communicate three-dimensional image information as a communication terminal, and in case that there is no problem even if data is of large volume since it is possible to use a high speed transmission line, and so on, there is no need to limit to 2 million pixels or less.

This directional image information is two-dimensional bit map information which includes parallax information of a three-dimensional object in a horizontal direction and a vertical direction. This two-dimensional bit map information is obtained by image-processing directional images in three directions, which were obtained by shooting of the above-described three units of cameras and by further applying interpolation processing to an image which exists between three pieces of images.

By carrying out display with the use of this two-dimensional bit map information, by a technique of integral photography which will be described in this embodiment, it is possible to obtain a stereoscopic image of an object which was shot. It is possible to arbitrarily select setting positions and the number of cameras, but preferably, the number of cameras is three units or more, and setting positions are at the periphery of a display section 306, and they are set so as to be dispersed, left and right, above and below, which is better.

Because it becomes possible to include horizontal parallax information and vertical parallax information in an image to be shot, in case that cameras are set at the periphery of the display section 6, so as to be dispersed in left/right, upward/downward directions.

In addition, in case that three units of cameras are used, although it is not shown in the figure, two units of cameras are disposed at left and right position above the display section 306, and a camera is disposed at a roughly center position below the display section 306, which becomes a position of a relationship between above and below, against these two units of cameras.

If this arrangement is used, horizontal direction parallax information is sufficiently obtained, and vertical direction parallax information becomes a little bit less than this.

However, the suchlike arrangement enables to convey a three-dimensional object more effectively, by less information as a way of conveying information of a three-dimensional object, since a human is sensitive to left and right information, from the view point of a characteristic of parallax of a human, but is not sensitive to upper and lower information.

305 designates a three-dimensional image projection section. The three-dimensional image projection section 305 projects two-dimensional bit map information including the obtained information of a three-dimensional object, to a display section 306.

As a fundamental principle of this portion, the technique in the embodiment 3, 4 is applied. Therefore, the three-dimensional image projection section 305 and the display section 306 are ones based upon the fundamental principle in the embodiment 3, 4.

Furthermore, 307 designates an operation section. By inputting to the operation section 307, it is possible for a user to initiate communication to a telephone call partner, and to carry out display, shooting etc. of a three-dimensional object. 308 designates a scanner/printing section. The scanner/printing section 308 enables the display section 306 to carry out display of a three-dimensional object, by loading three-dimensional object information (e.g., two-dimensional bit map information in which parallax information was included, etc.), and it is possible to print image information from a communication partner, as a normal facsimile device.

309 designates a disc drive. When a disc, in which for example, three-dimensional image information was stored, is loaded in the disc drive 309 and an operation of display is carried out by the operation section 307, it is possible to carry out three-dimensional display of a stereoscopic object on the display section 306.

310 designates an image of a three-dimensional object, which was displayed on the display section 306. The image of the three-dimensional object may be three-dimensional object information which was, for example, conveyed from a communication partner through communication, and may be one which displays a three-dimensional object which was shot by cameras 302, 303, 304, and as described above, may be one which is displayed by loading three-dimensional object information to the scanner/printing section 308, and may be one which carried out three-dimensional display on the display section 306 by loading a disc in which three-dimensional information was stored, to the disc drive 309.

INDUSTRIAL APPLICABILITY

As described above, the present invention is used for providing a three-dimensional image communication terminal which enables communication having sense of being engaged on a place and sense of reality.

What is claimed is:

1. A three-dimensional integral photography image display device, comprising:
    an image forming section to form element images of a plurality of view point images which includes parallax information in such a manner that an original three-dimensional object is formed in a space and the element images, which include image information of view points, are emitted from the three-dimensional object, wherein the element images are placed in a two-dimensional plane in accordance with the image forming section;
    a screen is disposed right behind a light beam controlling unit to control a light beam used to form an image, wherein the screen allows placement of the image information of the view points on the two-dimensional plane;
    a lens array disposed on the screen; and
    a projection section which projects the element images to form a projection image and controls a shape of the projection image, wherein the projection section sets a projection area that is smaller than a number of pixels of a projection device of the image forming section, and aligns a distorted projection of the element images with the lens array.

2. The three-dimensional integral photography image display device according to claim 1, wherein, as the image forming section, any one of a pin-hole array and a convex lens array is used.

3. The three-dimensional integral photography image display device according to claim 1, wherein, as the screen, any one of an emboss type diffusion plate, a hologram diffusion plate and a hologram screen is used.

4. The three-dimensional integral photography image display device according to claim 1, wherein a resolution of the element images which are projected to the screen and which include the image information of view points is set to 200 dpi or more.

5. The three-dimensional integral photography image display device according to claim 1, wherein, as the projection section, any one of a transmission type liquid crystal, a reflection type liquid crystal, a digital mirror device (DMD), an organic EL light emitting array, or a spatial light modulator (SLM) is used.

6. The three-dimensional integral photography image display device according claim 1, wherein a material of the screen is any one of photo polymer and dichromated gelatin.

7. The three-dimensional integral photography image display device according to claim 1, wherein, as a light source of the projection section, any one of a halogen lamp, an LED, a white color LED and an organic EL is used.

8. The three-dimensional integral photography image display device according to claim 5, wherein, when the reflection type liquid crystal is used as the projection section, a reflection type vertical orientation liquid crystal projection device is used as the projection section.

9. The three-dimensional integral photography image display device according to claim 1, wherein the screen and the light beam controlling unit are integrated.

* * * * *